US011113262B2

(12) United States Patent
Park et al.

(10) Patent No.: US 11,113,262 B2
(45) Date of Patent: Sep. 7, 2021

(54) TIME-EFFICIENT LOCK RELEASE IN DATABASE SYSTEMS

(71) Applicant: SAP SE, Walldorf (DE)

(72) Inventors: Changgyoo Park, Seoul (KR); Byunghoon Kim, Seoul (KR)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 16/371,234

(22) Filed: Apr. 1, 2019

(65) Prior Publication Data

US 2020/0311045 A1     Oct. 1, 2020

(51) Int. Cl.
*G06F 16/00*     (2019.01)
*G06F 16/23*     (2019.01)
(Continued)

(52) U.S. Cl.
CPC .......... *G06F 16/2343* (2019.01); *G06F 9/466* (2013.01); *G06F 16/1774* (2019.01);
(Continued)

(58) Field of Classification Search
CPC .. G06F 16/2343; G06F 16/22; G06F 16/2228; G06F 16/2379; G06F 16/2282;
(Continued)

(56) References Cited

U.S. PATENT DOCUMENTS 5,555,388 A * 9/1996 Shaughnessy ...... G06F 16/1774
                                                            711/100
5,655,100 A * 8/1997 Ebrahim ............. G06F 12/0822
                                                            711/121
(Continued)

FOREIGN PATENT DOCUMENTS

EP            0420425 A2 * 9/1990
EP            0433882 A2 * 12/1990
(Continued)

OTHER PUBLICATIONS

D. Agrawal et al., "The Performance of Protocols Based on Locks with Ordered Sharing", IEEE Transactions on Knowledge and Data Engineering, vol. 6, No. 5, Oct. 1994 , pp. 805-818.*
(Continued)

*Primary Examiner* — Srirama Channavajjala
(74) *Attorney, Agent, or Firm* — Fish & Richardson P.C.

(57) ABSTRACT

Implementations of the present disclosure include associating a first transaction executed within a database system with a first transaction control block (TCB) index, setting a status of the first transaction to active and a lock status of the first transaction to holding in response to a first set of locks being established for the first transaction, the first set of locks including one or more locks that each inhibit access to a respective resource within the database system, providing a lock table that records, for a set of locks within the database system, a set of lock owners including one or more transactions identified based on respective TCB indexes and a wait queue, and determining that the first transaction has completed, and in response setting the status of the first transaction to indicate completion of the transaction and the lock status of the first transaction to released.

20 Claims, 6 Drawing Sheets

(51) Int. Cl.
*G06F 9/46* (2006.01)
*G06F 16/22* (2019.01)
*G06F 16/176* (2019.01)

(52) U.S. Cl.
CPC ...... *G06F 16/2228* (2019.01); *G06F 16/2282* (2019.01); *G06F 16/2365* (2019.01); *G06F 16/2379* (2019.01)

(58) Field of Classification Search
CPC .. G06F 16/2322; G06F 16/289; G06F 16/901; G06F 16/137; G06F 16/152; G06F 16/524; G06F 16/332; G06F 16/1774; G06F 9/466; G06F 9/524
See application file for complete search history.

(56) References Cited

U.S. PATENT DOCUMENTS

| | | | | |
|---|---|---|---|---|
| 5,870,758 | A * | 2/1999 | Bamford | G06F 16/2343 |
| 6,138,169 | A * | 10/2000 | Freund | G06F 9/465 |
| | | | | 707/999.001 |
| 6,182,186 | B1 * | 1/2001 | Daynes | G06F 9/52 |
| | | | | 710/108 |
| 6,353,828 | B1 * | 3/2002 | Ganesh | G06F 16/2343 |
| 6,751,617 | B1 * | 6/2004 | Anfindsen | G06F 16/2343 |
| 6,934,717 | B1 * | 8/2005 | James | G06F 16/10 |
| 7,174,331 | B1 * | 2/2007 | Luo | G06F 16/2343 |
| 7,233,947 | B2 * | 6/2007 | Lomet | G06F 16/2477 |
| | | | | 707/703 |
| 7,499,924 | B2 * | 3/2009 | Watts | G06F 16/2343 |
| 7,917,651 | B2 * | 3/2011 | Khan | G06F 9/466 |
| | | | | 709/246 |
| 8,195,613 | B2 * | 6/2012 | Vukojevic | G06F 16/113 |
| | | | | 707/648 |
| 8,589,362 | B1 * | 11/2013 | Braam | G06F 16/1865 |
| | | | | 707/695 |
| 8,868,492 | B2 * | 10/2014 | Garin, Jr. | G06F 16/27 |
| | | | | 707/610 |
| 9,667,475 | B2 * | 5/2017 | Little | H04L 67/2833 |
| 9,792,318 | B2 | 10/2017 | Schreter et al. | |
| 9,798,759 | B2 | 10/2017 | Schreter et al. | |
| 9,824,134 | B2 | 11/2017 | Schreter et al. | |
| 2004/0054861 | A1 * | 3/2004 | Harres | G06F 9/524 |
| | | | | 711/163 |
| 2004/0177099 | A1 * | 9/2004 | Ganesh | G06F 11/1471 |
| 2012/0089735 | A1 * | 4/2012 | Attaluri | G06F 9/5038 |
| | | | | 709/226 |
| 2016/0042023 | A1 * | 2/2016 | Leach | G06F 16/2365 |
| | | | | 707/703 |
| 2016/0147813 | A1 | 5/2016 | Lee et al. | |
| 2017/0147628 | A1 | 5/2017 | Park et al. | |
| 2017/0147638 | A1 | 5/2017 | Park et al. | |
| 2018/0165327 | A1 * | 6/2018 | Graefe | G06F 16/2343 |
| 2018/0285380 | A1 * | 10/2018 | Davis | G06F 16/1774 |

FOREIGN PATENT DOCUMENTS

WO WO 2009/039118 A2 * 3/2009
WO WO 2015/119578 * 8/2015

OTHER PUBLICATIONS

C. Mohan et al., "Lock Conversion in Non-Two-Phase Locking Protocols", IEEE Transactions on Software Engineering (vol. SE-11, Issue: 1, Jan. 1985), pp. 15-22.*

D. Liang et al., "Performance analysis of long-lived transaction processing systems with rollbacks and aborts", IEEE Transactions on Knowledge and Data Engineering (vol. 8, Issue: 5, Oct. 1996), pp. 802-815.*

* cited by examiner

TIME-EFFICIENT LOCK RELEASE IN DATABASE SYSTEMS

BACKGROUND

Database systems store data that can be queried. For example, a query can be submitted to a database system, which processes the query and provides a query result. Queries are written in a query language. An example query language includes, without limitation, the structured query language (SQL), which can be described as a standard database language that is used to create, maintain and retrieve data stored in a relational database (e.g., a database, in which data is stored in relational tables).

Transactions can be performed within a database system, which impact data stored within the database system. For example, a transaction can insert, delete, or update data in one or more tables. During execution of transactions, the database system can implement locks to protect shared resources (e.g., tables, data rows, data blocks). A lock prohibits another transaction from acting on the same resource until the transaction impacting the resource is committed or is rolled back.

In some examples, a database system applies multi-phase locking to enforce serializability. In general, in multi-phase locking, transactions hold acquired database locks until they are committed or rolled back. Multi-phase locking can include an expanding phase, during which locks are acquired and no locks are released, and a shrinking phase, during which locks are released and no locks are acquired. Further, transactions only start releasing locks they have acquired when a commit or a rollback is issued. In traditional database systems, each transaction has an acquired lock list during its lifespan and the acquired lock list was used to unlock individual database locks one by one. Consequently, and with multi-phase locking (e.g., two-phase locking) lock release runs in $O(n+m)$ time, where n is the number of locks the transaction has acquired and m is the number of transactions that are waiting for the transaction to release locks and are to be woken by the transaction releasing the locks. This results in a significant delay in availability of resources.

SUMMARY

Implementations of the present disclosure include computer-implemented methods for releasing database locks. More particularly, implementations of the present disclosure are directed to releasing of database locks in constant time.

In some implementations, actions include associating a first transaction executed within a database system with a first transaction control block (TCB) index, setting a status of the first transaction to active and a lock status of the first transaction to holding in response to a first set of locks being established for the first transaction, the first set of locks including one or more locks that each inhibit access to a respective resource within the database system, providing a lock table that records, for a set of locks within the database system, a set of lock owners including one or more transactions identified based on respective TCB indexes and a wait queue, and determining that the first transaction has completed, and in response setting the status of the first transaction to indicate completion of the transaction and the lock status of the first transaction to released. Other implementations include corresponding systems, apparatus, and computer programs, configured to perform the actions of the methods, encoded on computer storage devices.

These and other implementations may each optionally include one or more of the following features: actions further include, in response to determining that the first transaction has completed and that a lock of the first transaction is identified within a lock owners map (LOM): waking a second transaction for execution, and transferring ownership of the lock to the second transaction by updating a status of the lock within the lock table to associate the lock with the second transaction and to remove the second transaction from a wait queue of the lock; the second transaction adds the lock of the first transaction to the LOM; actions further include, for each lock in the lock table, determining a status of a transaction indicated as an owner of the lock, and removing the lock from the lock table in response to determining that the status of the transaction is complete; for each lock in the lock table, determining a status of a transaction indicated as an owner of the lock is periodically executed; setting the status of the first transaction to indicate completion of the transaction includes setting the status of the first transaction to one of committed and rolled back; and resources within the database system include a table and a record in a table.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure include computer-implemented methods for releasing database locks. More particularly, implementations of the present disclosure are directed to releasing of database locks in constant time. In some implementations, actions include associating a first transaction executed within a database system with a first transaction control block (TCB) index, setting a status of the first transaction to active and a lock status of the first transaction to holding in response to a first set of locks being established for the first transaction, the first set of locks including one or more locks that each inhibit access to a respective resource within the database system, providing a lock table that records, for a set of locks within the database system, a set of lock owners including one or more transactions identified based on respective TCB indexes and a wait queue, and determining that the first transaction has completed, and in response setting the status of the first transaction to indicate completion of the transaction and the lock status of the first transaction to released.

Implementations of the present disclosure are described in further detail herein with reference to an example database system. The example database system includes an in-memory database system. An example in-memory database system includes SAP HANA provided by SAP SE of Walldorf, Germany. In general, an in-memory database system uses main memory for data storage. Main memory may include one or more types of memory (e.g., DRAM, NVM) that communicates with one or more processors (e.g., CPU(s)) over a memory bus. An in-memory database system may be contrasted with database management systems that employ a disk storage mechanism. In some examples, in-memory database systems may be faster than disk storage databases, because internal optimization algorithms may be simpler and execute fewer instructions. In some examples, accessing data in an in-memory database system may reduce or eliminate seek time when querying the data, providing faster and more predictable performance than disk-storage databases. It is contemplated, however, that implementations of the present disclosure can be realized with any appropriate database system.

Figure 1:
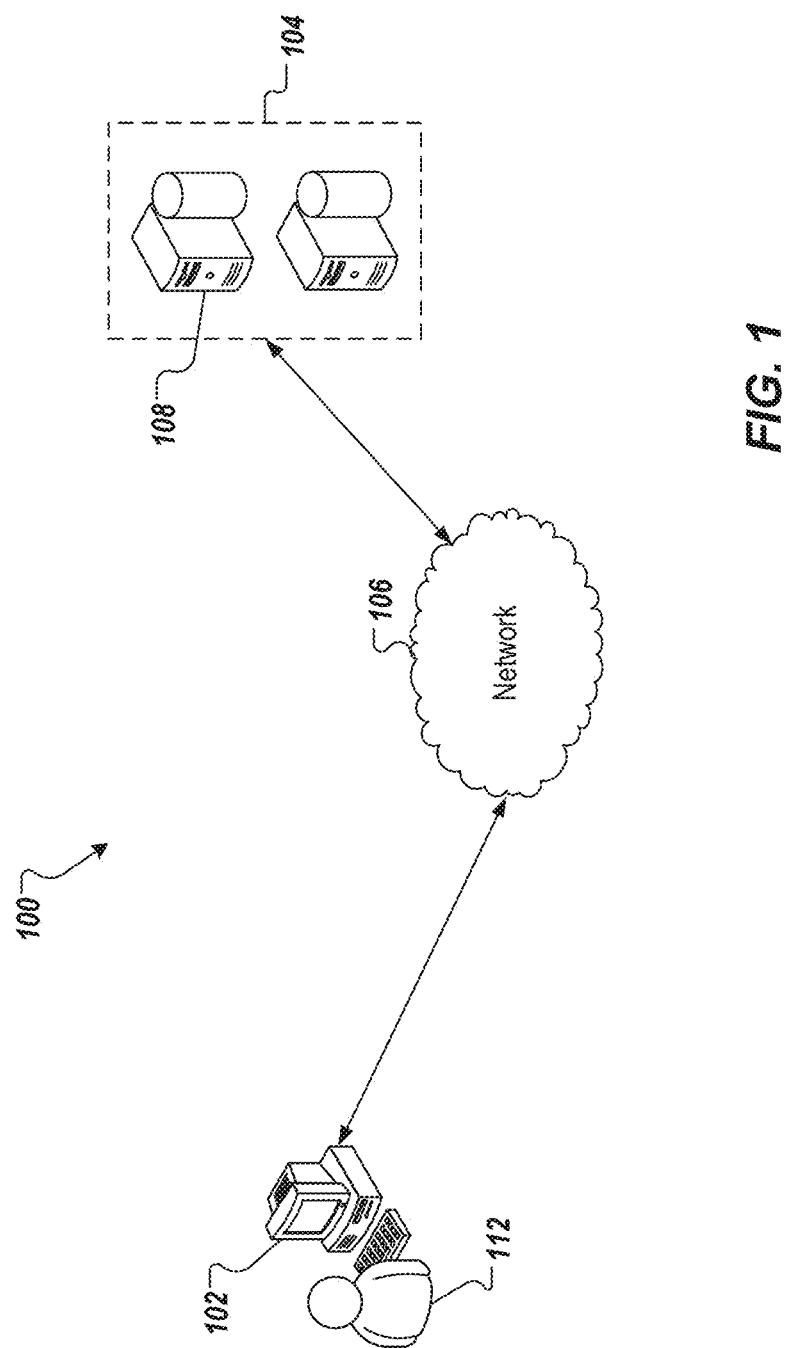
FIG. 1 depicts an example environment that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and in view of the example use case, the server system 104 can host an in-memory database system (e.g., SAP HANA). In some examples, transactions are executed within the database system. For example, a transaction can insert, delete, or update data in one or more tables. During execution of transactions, the database system can implement locks to protect shared resources (e.g., tables, data rows, data blocks). A lock prohibits another transaction from acting on the same resource until the transaction impacting the resource is committed. In accordance with implementations of the present disclosure, and as described in further detail herein, the database system enables locks of a transaction to be released in constant time (i.e., O(1) time) regardless of the number of locks the transaction has acquired. As used herein, lock release time refers to time taken to mark a lock status of a transaction control block (TCB) as 'released' and pass the TCB to a background thread (released lock collector, described in further detail herein, this time being constant in accordance with implementations of the present disclosure.

To provide further context for implementations of the present disclosure, and as introduced above, transactions can be performed within a database system, which impact data stored within the database system. For example, a transaction can insert, delete, or update data in one or more tables. During execution of transactions, the database system can implement locks to protect shared resources (e.g., tables, data rows, data blocks). A lock prohibits another transaction from acting on the same resource until the transaction impacting the resource is committed.

A traditional locking mechanism includes multi-phase locking, such as two-phase locking. In general, in two-phase locking, transactions hold acquired database locks until they are committed or rolled back. Two-phase locking includes an expanding phase, during which locks are acquired and no locks are released, and a shrinking phase, during which locks are released and no locks are acquired. Further, transactions only start releasing locks they have acquired when a commit or a rollback is issued. In traditional database systems, each transaction has an acquired lock list during its lifespan and the acquired lock list was used to unlock individual database locks one by one. Consequently, lock release runs in O(n+m) time, where n is the number of locks the transaction has acquired and m is the number of transactions that are waiting for the transaction to release locks. This results in a significant delay in availability of resources. within the database system.

To illustrate this, multiple transactions executing within a database system using traditional multi-phase locking can be considered. Each transaction keeps track of its acquired locks (e.g., acquired during an expansion phase) and uses the information to eventually release the locks (e.g., during a shrinking phase after changes of the transaction have been committed or rolled back). In some examples, a lock table records a data set associated with each lock key. In some examples, a lock key is provided as a data pair (e.g., 128-bit data pair) that includes a type identifier (type id) (e.g., Table, Record) and a key (e.g., 0x90, 0x1010). In some examples, a data set of a lock key indicates a lock owner (e.g., 8-byte transaction identifier), a lock mode (e.g., exclusive lock (X), intension exclusive lock (IX)), a number of waiting transactions (also referred to as waiters, or lock waiters), and a wait queue (e.g., transaction identifiers for transactions waiting for a particular lock). In some examples, the data set can include a total of 48-bytes of data. An example lock table provided using traditional, multi-phase locking includes:

Example Traditional Lock Table

| Lock Key | Data |
| --- | --- |
| Record, 0x90 | owners = {25511}, mode = X, waiters = 0, waitQueue = ( ) |
| Table, 0x1010 | owners = {25511, 25517}, mode = IX, waiters = 0, waitQueue = ( ) |
| Record, 0x88 | owners = {25511}, mode = X, waiters = 1, waitQueue = (25517) |
| Table 0x1020 | owners = {25524}, mode = X, waiters = 0, waitQueue = ( ) |

In the above example, Transaction 25511 acquires three locks: {(Table, 0x1010):IX, (Record, 0x88):X, (Record, 0x90):X}, and Transaction 25517 acquires one lock: (Table, 0x1010):IX, and waits for one lock: (Record, 0x88):X (which is owned by Transaction 25511. After Transaction 25511 is executed and commit or rollback is issued, an iteration is performed over the acquired lock set (e.g., three locks), during which a call 'unlock' API of a lock table manager (LTM) is performed for each lock key (e.g., three unlock calls are made). After Record, 0x88 is released by Transaction 25511, Transaction 25511 wakes up Transaction 25517, which acquires a lock (Record, 0x88), and its lock set becomes {(Table, 0x1010), (Record, 0x88)}. Continuing with this example, Transaction 25517 can acquire an additional lock (Record, 0x90), and its acquired lock set becomes {(Table, 0x1010), (Record, 0x88), (Record, 0x90) }. After Transaction 25517 is executed and commit or rollback is issued, an iteration is performed over the acquired lock set (e.g., three locks), during which the call 'unlock' API of the LTM is performed for each lock key (e.g., three unlock calls are made).

Accordingly, in the traditional multi-phase locking, the acquired lock set for each transaction is stored in an acquired lock list that is maintained within the transaction manager. This requires both memory to store the acquired lock list, as well as processing to update the acquired lock list as locks are acquired or released. As noted above, because all locks are only released after commit/rollback of a transaction, lock release requires O(n+m) time, where n is the number of locks the transaction has acquired and m is the number of transactions that are waiting for the transaction to release locks. Further, for a transaction having multiple locks, multiple API calls need to be performed over multiple iterations.

In view of this, implementations of the present disclosure enable lock release in O(1) time, also referred to as constant time. More particularly, and as described in further detail herein, implementations of the present disclosure release locks in O(1) time without maintaining an acquired lock list. In some implementations, a TCB of a lock owner (e.g., a transaction) is marked as 'released' to enable the transaction to release all acquired locks at once. In this manner, another transaction is instantly able to acquire the lock. This enables the time complexity of unlock to be reduced to O(1) time, resulting in faster commits or rollbacks than traditionally achieved. Further, less memory is consumed within the database system, because no acquired lock list need be maintained for each transaction.

In further detail, locks that have been acquired by a transaction having a TCB marked 'released' are not considered to be acquired locks. Consequently, other transactions can freely acquire the locks. As described in further detail herein, implementations of the present disclosure provide a background thread, referred to herein as a released lock collector (RLC), that is responsible for waking up waiting transactions and reclaiming memory of released lock items. Every committed or rolled back transaction will invoke the RLC by yielding its TCB ownership to the RLC. In response, the RLC can take a partial scan action to transfer lock ownership to waiting transactions, if any. In some implementations, the TCB object is reclaimed once the RLC ensures that no lock items have the TCB in its 'owners' field after a full scan action. More particularly, and as described in further detail herein, each lock item stores a TCB index instead of the TCB itself, and a TCB index (array) is managed by the transaction manager.

In some implementations, a partial scan provides eager lock ownership transfer to transactions that are waiting for a lock (also referred to as lock waiters). In some examples, when a transaction starts to wait for a lock (e.g., another transaction is holding the lock), the transaction registers a data set with the RLC, which the RLC maintains in a lock owner map (LOM). In some examples, the data set is provided as a pair that includes a lock owner transaction (LOT) index (e.g., $I_{LO}$, a 4-byte, TCB index) and a set of lock keys (e.g., $\mathbb{K} = k_1, \ldots, k_n$). In some examples, the LOT index (e.g., 1, 7) indicates a transaction (as a current lock owner) and the set of lock keys indicate one or more locks owned by the transaction (e.g., {(Record, 0x88)}; {(Record, 0x98), (Record, 0x100)}). In some examples, a lock key ($k_i$) is provided as a data pair (e.g., 128-bit data pair) that includes a type identifier (type id) (e.g., Table, Record) and a key (e.g., 0x90, 0x1010). The following is a non-limiting example of a LOM:

Example LOM

| $I_{LO}$ | $\mathbb{K}$ |
| --- | --- |
| 1 | {(Record, 0x88)} |
| 7 | {(Record, 0x98), (Record, 0x100)} |

After the transaction registers the data set with the RLC and the data set is recorded in the LOM, the transaction waits for the lock to be released. When the transaction that has owned the lock is committed or rolled back, the RLC performs a partial scan to wake the waiting transaction up and transfer ownership of the lock. That is, the RLC transfers ownership of the lock key set to the waiting transaction as the lock owner. During a partial scan, only lock items that have been registered by lock waiters will be processed, while other locks remain untouched. The TCB is passed to full scan queue once partial scan is completed.

In some implementations, a full scan can be executed to reclaim memory of vacant lock items. In some examples, a vacant lock item includes either no lock owners, or no lock waiters. In some implementations, the full scan is executed periodically (e.g., every X minute(s)). In some examples, the full scan is not actively invoked by committing or rolling back transactions. The full scan checks the 'owners' field of each lock item and remove an owner if the owner TCB is marked 'lock released'. If there are no owners or lock waiting transactions after updating the 'owners' field, the lock item is removed from the lock table. After updating the 'owners' field of all existing lock items, RLC frees up the heap memory of TCBs that have been yielded by committing or rolling back transactions. At this point, it is guaranteed that there are no lock items that refer to the TCBs in the full scan that are destroyed by RLC.

As described above, the partial scan only cleans up lock items that are being waited on by other transactions. Therefore, there can be a number of lock items that store outdated lock owner information, which will be cleaned up during the next full scan. This delayed update in lock owner can provide advantages in memory management. An example advantage can be reduced heap memory allocation. For example, most online transaction processing (OLTP) workloads have a data hotspot that is frequently updated by multiple transactions. The partial scan of the present disclosure postpones lock item memory reclamation until a full scan is taken. This enables lock items that are associated with the data hotspot to be repeatedly reused without memory allocation.

Implementations of the present disclosure also provide other instances, in which outdated lock owners are removed from a lock item. For example, when a transaction tries to acquire a lock that is in X-mode, and the transaction determines that the owner of the lock item is obsolete (e.g., by looking at the TCB of the supposed owner), the transaction overwrites its TCB index on the outdated TCB index without re-allocating the lock item.

Figure 2:
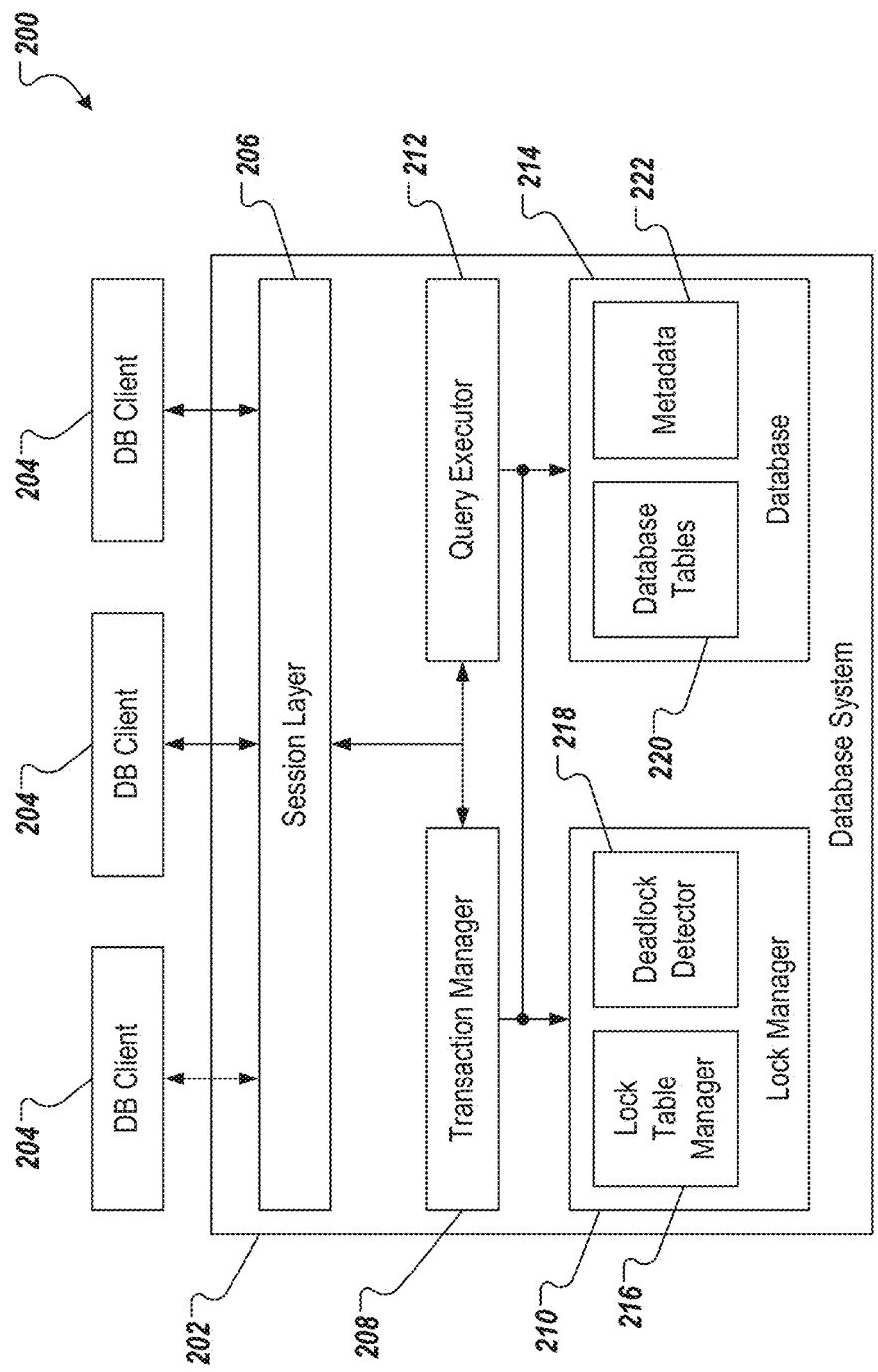
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a database system 202 and multiple clients 204. In some examples, each client issues one or more transactions to the database system 202 that operate on data stored therein. In some examples, a database client 204 can include an application executing on a computing device, the application issuing transactions to the database system 202. In some examples, a database client 204 can include a user that issues transactions to the database system through a computing device. In some examples, the database system 202 is provided as an SAP HANA database system, described above.

In the example of FIG. 2, the database system 202 includes a session layer 206, a transaction manager 208, a lock manager 210, a query executor 212, and a database 214. In some examples, each database client 204 establishes a session with the database system 202 through the session layer 206. During a session, the database client 204 submits queries to and receives query results from the database system through the session layer 206. In some examples, a transaction is submitted to the database system 202 (e.g., as an operation in a query).

The transaction manager 208 manages execution of transactions and coordinates lock acquisition and lock release with the lock manager 210. The lock manager 210 includes a LTM 216 and a deadlock detector 218 for managing lock acquisition and lock release to release locks in constant time in accordance with implementations of the present disclosure. The query executor 212 executes received queries (e.g., query parsing, query execution plan (QEP) generation/optimization, QEP execution) to provide query results based on data stored in the database 214. The database 214 includes database tables 220, within which data is stored, and metadata 222. In some examples, a transaction operates on a table of the database tables and/or a record within a table. Consequently, and among other resources, a table and a record can each be considered a resource that can be locked during execution of a transaction.

In accordance with implementations of the present disclosure, a transaction manager (e.g., the transaction manager 208 of FIG. 2) and a LTM (e.g., the LTM 216 of FIG. 2) coordinate lock acquisition and lock release to enable locks of a transaction to be released in constant time (i.e., O(1) time) regardless of the number of locks the transaction has acquired.

Figure 3A:
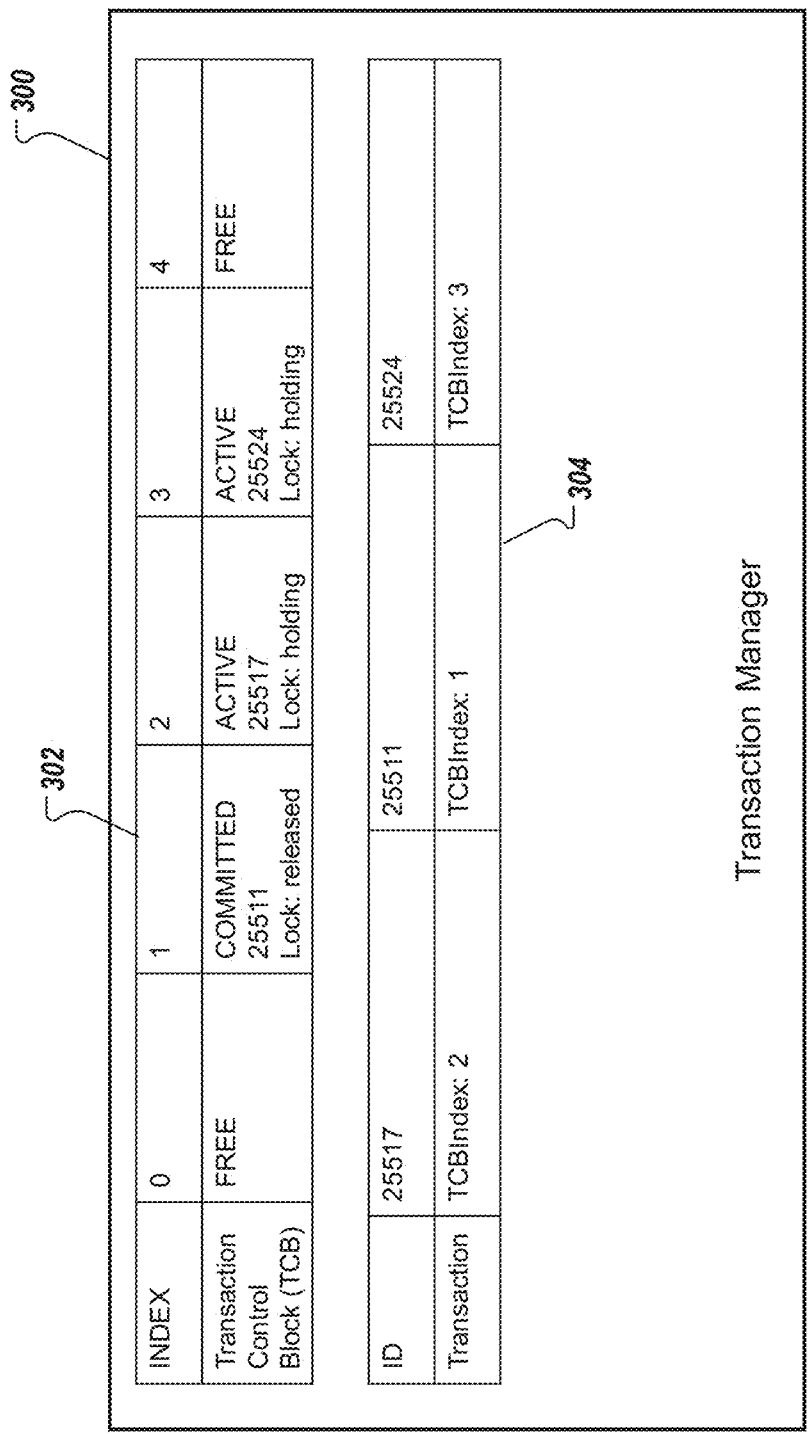
FIG. 3A depicts an example transaction manager in accordance with implementations of the present disclosure.

FIG. 3A depicts an example transaction manager 300 in accordance with implementations of the present disclosure. The transaction manager 300 includes a transaction control block (TCB) table 302 and a transaction table 304. In some examples, the TCB table 302 provides a transaction state (e.g., active, committed) and a lock state (e.g., release, holding) of each transaction of a plurality of transactions. In some examples, the transaction table 304 relates each transaction of a plurality of transactions to a respective index in the TCB table 302. In comparison to traditional locking described above, it can be noted that the transaction table 304 is absent an acquired lock list for any of the transactions provided therein. That is, and as described above, implementations of the present disclosure obviate acquired lock lists for transactions. Instead, the transaction table 304 provides a pointer to the TCB for a respective transaction.

Figure 3B:
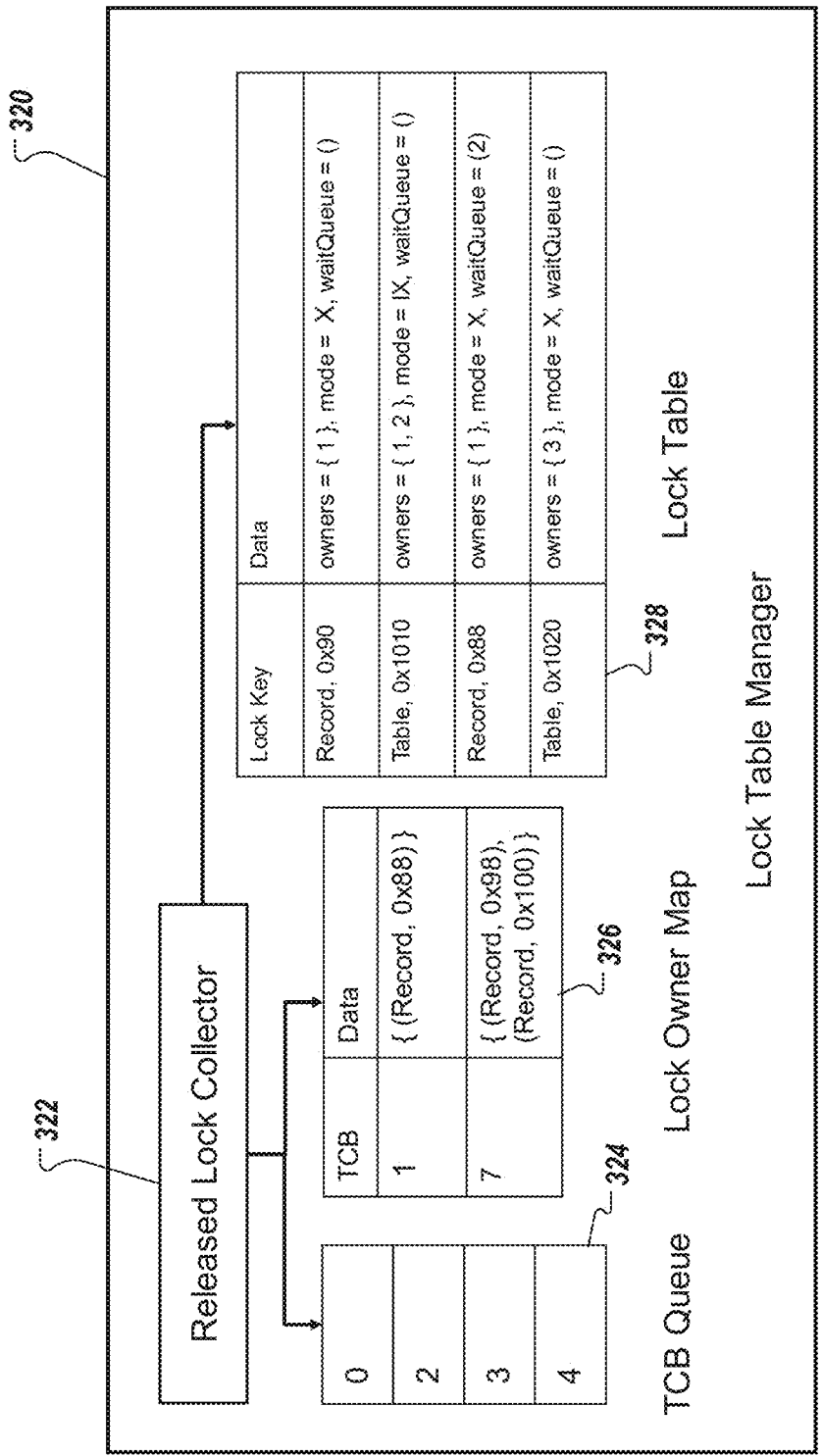
FIG. 3B depicts an example lock table manager in accordance with implementations of the present disclosure.

FIG. 3B depicts an example LTM 320 (e.g., the LTM 216 of FIG. 2) in accordance with implementations of the present disclosure. In the depicted example, the LTM 320 includes a RLC 322, a TCB queue 324, a LOM 326, and a lock table 328. It can be seen that the amount of data stored in the lock table 328 is smaller relative to the amount of data that is stored in lock tables in traditional locking described above. For example, and in accordance with implementations of the present disclosure, the lock table 328 only records TCB indexes of transactions (e.g., 1, 2, 3), as opposed to the full transaction identifiers (e.g., 25511, 25517, 25524) for both the owners and the wait queue. This reduces the memory consumption by half (e.g., TCB index=4-byte; Transaction ID=8-byte). It can be noted that TCB indexes are reused repeatedly (i.e., TCB instances are reused), but transaction identifiers are strictly unique in a database system. Once a Transaction ID is generated, the Transaction ID will never be used again in the same database system.

A non-limiting example is described to illustrate implementations of the present disclosure with reference to FIGS. 3A and 3B. In accordance with implementations of the present disclosure, a transaction does not keep track of acquired locks. Instead the LTM determines whether a lock is held by a transaction. For example, Transaction 25511 (TCB: 1) acquires three locks: {(Table, 0x1010):IX, (Record, 0x88):X, (Record, 0x90):X} and Transaction 25517 (TCB: 2) acquires one lock: (Table, 0x1010):IX, and waits for one lock: (Record, 0x88):X, as depicted in the lock table 328 of FIG. 3B. Transaction 25517 (TCB: 2) adds the lock owner and the lock key pair to the LOM 326: LockOwnerMap={1: {(Record, 0x88)}}. Transaction 25511 (TCB: 1) completes and either a commit or a rollback is issued. Consequently, the lock status of TCB: 1 of the TCB table 302 of FIG. 3A is updated to 'released' and is passed the LTM 320 of FIG. 3B. In can be noted that, a committed/rolled back TCB is passed to the LTM 320 by being enqueued to the TCB queue 324. It will be a subject of further partial scan.

In this example, a partial scan is performed (e.g., by the RLC 322), during which the LTM 320 determines that there is a waiting transaction by searching the LOM 326. In response, Transaction 25517, the waiting transaction, is wakened and ownership of the lock is transferred to Transaction 25517 (e.g., for Record, 0x88 in the lock table 328, owners={1} changes to owners={2}, and the wait queue is cleared. Continuing with this example, Transaction 25517 (TCB: 2) acquires an additional lock: (Record, 0x90). Although the lock item is still marked as locked (e.g., for Record, 0x90 in the lock table 328, owners={1})), but the transaction finds that the lock owner is gone. More particularly, the the transaction searches the TCB array in the transaction manager for TCB:1 and sees the lock status as 'released'. Eventually, Transaction 25517 (TCB: 2) completes and either a commit or rollback is issued. Consequently, the lock status of TCB:2 of the TCB table 302 of FIG. 3A is updated to 'released' and is passed the LTM 320 of FIG. 3B.

A full scan is performed (e.g., periodically), as described herein. During the full scan, a garbage collector of the LTM 320 removes all lock items. Any transactions marked as 'unlocked' are cleared. In this manner, and as described above, heap memory allocation is reduced.

Figure 4:
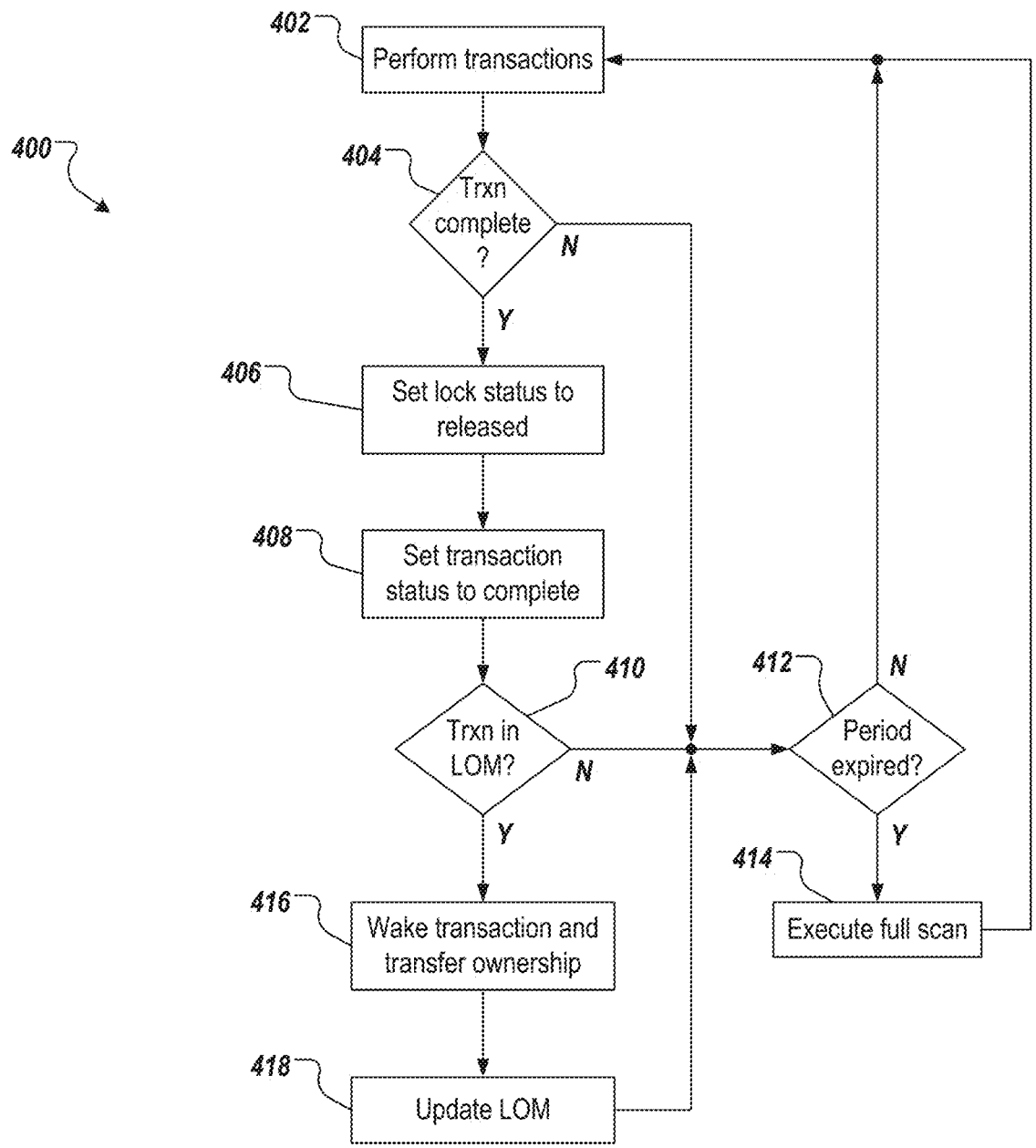
FIG. 4 depicts an example process that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 can be performed for releasing transaction locks in constant time for transactions executed in database systems.

Transactions are performed within a database system (402). For example, and in accordance with implementations of the present disclosure, transactions are executed within the database system, one or more of the transactions using locks to lock resources that the transaction acts on. In some implementations, each transaction is associated with a TCB index that is used to uniquely identify the transaction (e.g., in the transaction table 304 of FIG. 3A). In some implementations, a status of the transaction and one or more locks of the transaction are defined (e.g., within the TCB table 302 of FIG. 3A). In some examples, transactions that are executing are associated with an active status, and transactions that are complete are associated with one of a complete status and a rolled back status. In some examples, locks associated with a completed transaction are associated with a released status, and locks associated with an executing transaction are associated with a holding status.

It is determined whether a transaction has completed (404). If a transaction has not completed, it is determined whether a period has expired (412). For example, and as described above, a period can be defined for periodically executing a full scan. If the period has not expired, the example process 400 loops back. If the period has expired, a full scan is executed (414) and the example process 400 loops back. For example, the full scan is executed to determine whether the transaction manager includes any completed TCB instances can be cleared from memory (e.g., TCB instances of transactions that completed and have a lock release status of released since the last full scan was performed).

If a transaction has completed, a lock status of the transaction is set to released (406), and a status of the transaction is set to complete (408). For example, the TCB in the TCB table 302 that corresponds to the transaction (i.e., based on the transaction's TCB index) is updated to reflect the changed status of the transaction and release status of the corresponding lock(s). In some examples, a complete status can indicate either commit (e.g., changes made by the transaction to resources are committed to the database), or rolled back (e.g., changes made by the transaction to resources are rolled back within the database).

It is determined whether the transaction is included in the LOM (410). For example, a partial scan can be performed to cross-reference the TCB index of the transaction with the LOM to determine whether another transaction is queued for a lock that is being released by the completed transaction. If the transaction is not included in the LOM, it is determined whether a period has expired (412), as described above. If the transaction is included in the LOM, a transaction is woken and ownership of the lock is transferred to the transaction (416). That is, the transaction that added the completed transaction to the LOM is woken and takes over the lock that the completed transaction is releasing. The LOM is updated (418) and the example process 400 loops back. For example, the LOM is updated to remove the completed transaction.

Figure 5:
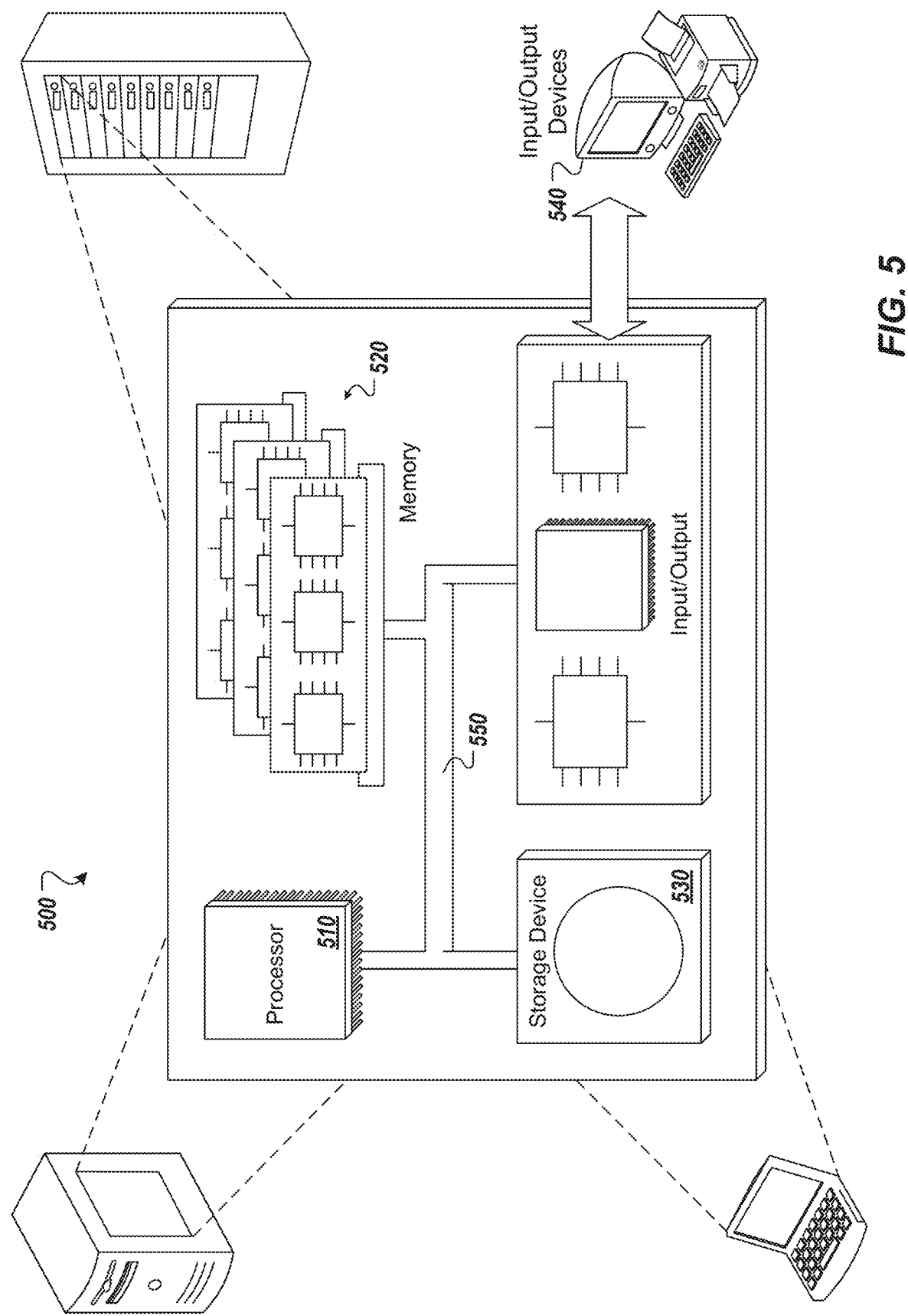
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid-state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for releasing transaction locks in constant time for transactions executed in database systems, the method comprising:
   executing, within a database system, a first transaction on resources in the database system;
   in response to executing the first transaction, establishing a first set of locks, each lock corresponding to a resource the first transaction is executed on and each lock prohibiting accesses from other transactions to the respective resource within the database system;
   associating the first transaction with a first transaction control block (TCB) index of a transaction control table, each entry of the transaction control table comprising a transaction control index associated with a respective transaction, a transaction status and a lock status of the respective transaction;
   setting, within the transaction control table, the transaction status of the first transaction to active in response to executing the first transaction and the lock status of the first transaction to holding in response to the first set of locks being established for the first transaction;
   providing a lock table that records, for a set of locks within the database system, a set of lock owners comprising one or more transactions identified based on respective TCB indexes and a wait queue;
   determining that the first transaction has completed, and in response setting the transaction status of the first transaction to indicate completion of the transaction and the lock status of the first transaction to released; and
   releasing the first set of locks in response to the setting of the lock status of the first transaction to released.

2. The method of claim 1, further comprising, in response to determining that the first transaction has completed and that a lock of the first transaction is identified within a lock owners map (LOM):
   waking a second transaction for execution; and
   transferring ownership of the lock to the second transaction by updating a status of the lock within the lock table to associate the lock with the second transaction and to remove the second transaction from a wait queue of the lock.

3. The method of claim 2, wherein the second transaction adds the lock of the first transaction to the LOM.

4. The method of claim 1, further comprising, for each lock in the lock table, determining a status of a transaction indicated as an owner of the lock, and removing the lock from the lock table in response to determining that the status of the transaction is complete.

5. The method of claim 4, wherein, for each lock in the lock table, determining a status of a transaction indicated as an owner of the lock is periodically executed.

6. The method of claim 1, wherein setting the transaction status of the first transaction to indicate completion of the transaction comprises setting the transaction status of the first transaction to one of committed and rolled back.

7. The method of claim 1, wherein resources within the database system comprise a table and a record in a table.

8. A non-transitory computer-readable storage medium coupled to one or more processors and having instructions stored thereon which, when executed by the one or more processors, cause the one or more processors to perform operations for releasing transaction locks in constant time for transactions executed in database systems, the operations comprising:
   executing, within a database system, a first transaction on resources in the database system;
   in response to executing the first transaction, establishing a first set of locks, each lock corresponding to a resource the first transaction is executed on and each lock prohibiting accesses from other transactions to the respective resource within the database system;
   associating the first transaction with a first transaction control block (TCB) index of a transaction control table, each entry of the transaction control table comprising a transaction control index associated with a respective transaction, a transaction status and a lock status of the respective transaction;
   setting, within the transaction control table, the transaction status of the first transaction to active in response to executing the first transaction and the lock status of the first transaction to holding in response to the first set of locks being established for the first transaction;
   providing a lock table that records, for a set of locks within the database system, a set of lock owners comprising one or more transactions identified based on respective TCB indexes and a wait queue;
   determining that the first transaction has completed, and in response setting the transaction status of the first transaction to indicate completion of the transaction and the lock status of the first transaction to released; and
   releasing the first set of locks in response to the setting of the lock status of the first transaction to released.

9. The computer-readable storage medium of claim 8, wherein operations further comprise, in response to determining that the first transaction has completed and that a lock of the first transaction is identified within a lock owners map (LOM):
   waking a second transaction for execution; and
   transferring ownership of the lock to the second transaction by updating a status of the lock within the lock table to associate the lock with the second transaction and to remove the second transaction from a wait queue of the lock.

10. The computer-readable storage medium of claim 9, wherein the second transaction adds the lock of the first transaction to the LOM.

11. The computer-readable storage medium of claim 8, wherein operations further comprise, for each lock in the lock table, determining a status of a transaction indicated as an owner of the lock, and removing the lock from the lock table in response to determining that the status of the transaction is complete.

12. The computer-readable storage medium of claim 11, wherein, for each lock in the lock table, determining a status of a transaction indicated as an owner of the lock is periodically executed.

13. The computer-readable storage medium of claim 8, wherein setting the transaction status of the first transaction to indicate completion of the transaction comprises setting the transaction status of the first transaction to one of committed and rolled back.

14. The computer-readable storage medium of claim 8, wherein resources within the database system comprise a table and a record in a table.

15. A system, comprising:
one or more computers; and
a computer-readable storage device coupled to the computing device and having instructions stored thereon which, when executed by the computing device, cause the computing device to perform operations for releasing transaction locks in constant time for transactions executed in database systems, the operations comprising:
executing, within a database system, a first transaction on resources in the database system;
in response to executing the first transaction, establishing a first set of locks, each lock corresponding to a resource the first transaction is executed on and each lock prohibiting accesses from other transactions to the respective resource within the database system;
associating the first transaction with a first transaction control block (TCB) index of a transaction control table, each entry of the transaction control table comprising a transaction control index associated with a respective transaction, a transaction status and a lock status of the respective transaction;
setting, within the transaction control table, the transaction status of the first transaction to active in response to executing the first transaction and the lock status of the first transaction to holding in response to the first set of locks being established for the first transaction;
providing a lock table that records, for a set of locks within the database system, a set of lock owners comprising one or more transactions identified based on respective TCB indexes and a wait queue;
determining that the first transaction has completed, and in response setting the transaction status of the first transaction to indicate completion of the transaction and the lock status of the first transaction to released; and
releasing the first set of locks in response to the setting of the lock status of the first transaction to released.

16. The system of claim 15, wherein operations further comprise, in response to determining that the first transaction has completed and that a lock of the first transaction is identified within a lock owners map (LOM):
waking a second transaction for execution; and
transferring ownership of the lock to the second transaction by updating a status of the lock within the lock table to associate the lock with the second transaction and to remove the second transaction from a wait queue of the lock.

17. The system of claim 16, wherein the second transaction adds the lock of the first transaction to the LOM.

18. The system of claim 15, wherein operations further comprise, for each lock in the lock table, determining a status of a transaction indicated as an owner of the lock, and removing the lock from the lock table in response to determining that the status of the transaction is complete.

19. The system of claim 18, wherein, for each lock in the lock table, determining a status of a transaction indicated as an owner of the lock is periodically executed.

20. The system of claim 15, wherein setting the transaction status of the first transaction to indicate completion of the transaction comprises setting the transaction status of the first transaction to one of committed and rolled back.

* * * * *